Jan. 8, 1929.
L. F. STIEHM
1,698,204
LIQUID STRAINER
Filed Dec. 19, 1927
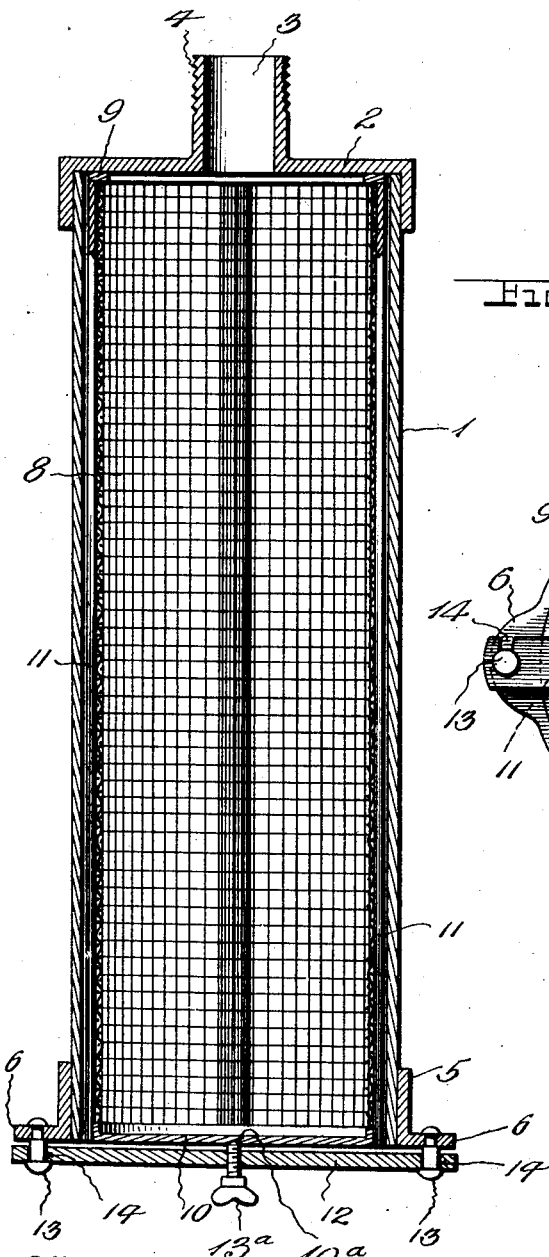
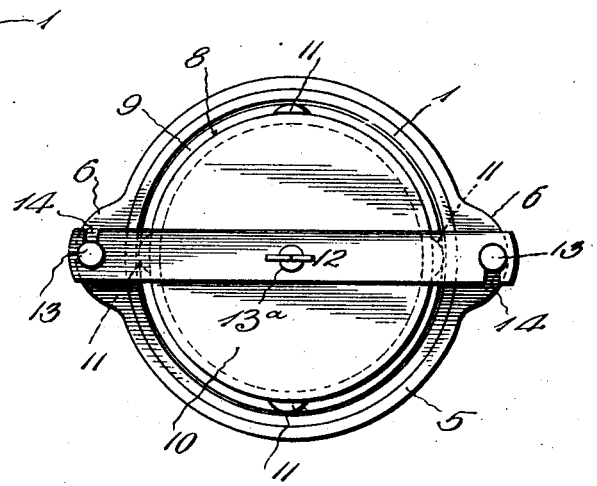
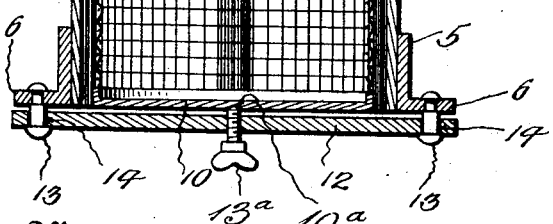
Inventor
L. F. Stiehm.
By H. B. Willson & Co.
Attorneys Patented Jan. 8, 1929.

1,698,204

UNITED STATES PATENT OFFICE.

LOUIS F. STIEHM, OF ROLLINGSTONE, MINNESOTA.

LIQUID STRAINER.

Application filed December 19, 1927. Serial No. 241,109.

The invention aims to provide a new and improved construction of strainer designed primarily for straining cream, although not restricted to such use, novel provision being made for detachably holding a cylindrical strainer centered within a cylindrical casing in such manner that it may effectively perform its straining function and may be readily removed for cleaning.

With the foregoing in view, the invention resides in the novel subject matter hereinafter described and claimed, the description being supplemented by the accompanying drawing.

Fig. 1 is a vertical longitudinal sectional view through a strainer constructed in accordance with my invention.

Fig. 2 is a lower end view.

In the drawing above briefly described, the numeral 1 denotes a cylindrical imperforate casing which is open at its lower end but is closed at its upper end by an appropriate cap 2 soldered or otherwise secured in place, said cap having a central liquid inlet 3, which may well be provided with screw threads 4 for connecting it with a liquid supply pipe, hose or the like. Around the lower end of the casing 1, I secure a ring 5, by soldering or by other preferred securing means, said ring being provided with diametrically opposed outstanding lugs 6 having threaded openings 7.

Within the cylindrical casing 1 and coextensive in length therewith, though of somewhat smaller diameter, is a cylindrical strainer 8 which may if desired consist of a number of tubes one within another. This strainer is open at its upper end and provided at said end with a metal ring 9 which abuts the lower side of the cap 2, said open end of the strainer being in communication with the liquid inlet 3. The lower end of the strainer 8 is provided with an imperforate closure 10 having a shallow socket 10ª in its bottom. Wire mesh of suitable gauge is preferably employed for the strainer 8 and it will of course be understood that the coarse mesh shown on the drawing, is for illustrative purposes only, as the mesh used is so fine that only liquid may pass therethrough.

Soldered or otherwise secured to the outer side of the strainer 8 and extending from end to end thereof, are a plurality of metal bars 11. These bars not only stiffen the strainer, but they space it uniformly from the cylindrical casing 1, so that the liquid from the interior of said strainer may pass outwardly therethrough and descend in the space between the strainer and casing.

Disposed under and extending diametrically across the closure 10 is a strainer-retaining bar 12 having lateral notches 14 in its ends opening in opposite directions and receiving headed studs 13 which project downwardly from the lugs 6. Threaded through bar 12, is a thumb screw 13ª whose upper end is received in the socket 10ª, so that tightening of this screw holds the strainer 8 tightly against the cap 2. By loosening the screw 13ª and detaching the bar 12, the entire strainer may be withdrawn from the casing 1, for effective cleaning and sterilizing of cylinder and strainer and bar.

It will be seen from the foregoing that an exceptionally simple and inexpensive, yet an efficient, reliable and generally desirable device has been provided, and while the details herein disclosed are preferably followed, minor variations may be made within the scope of the invention as claimed.

I claim:—

1. A strainer comprising a vertically elongated cylindrical casing open at its lower end and at its upper end provided with a closure having a liquid inlet, a cylindrical strainer within said casing and co-extensive in length therewith, said strainer having an open upper end abutting said closure and in communication with said inlet, and a closed lower end, stiffening bars secured to the outer side of said strainer and spacing it uniformly from the casing wall, said bars extending from end to end of said strainer, a strainer-retaining bar under and extending diametrically across the closed end of said strainer, means detachably securing the ends of said retaining bar to said casing, and a strainer-holding screw threaded through said bar and bearing against the closed lower end of the strainer.

2. A strainer comprising a vertically elongated cylindrical casing open at its lower end and at its upper end provided with a closure having a liquid inlet, a cylindrical strainer within said casing and co-extensive in length therewith, said strainer having an open upper end abutting said closure and in communication with said inlet, and a closed lower end, stiffening bars secured to the outer side of said strainer and spacing it uniformly from the casing wall, said bars extending from end to end of said strainer, a strainer-retaining bar under and extending diametrically across the closed end of said strainer, said bar having lateral oppositely facing notches in its ends, a ring secured around the lower end of said casing and having diametrically opposed outwardly projecting lugs overlying said notches, headed studs projecting downwardly from said lugs and received in said notches, and a strainer-holding screw threaded through said retaining bar and contacting with said closed lower end of the strainer.

In testimony whereof I have hereunto affixed my signature.

LOUIS F. STIEHM.